United States Patent
Dong (10) Patent No.: US 9,521,272 B2
(45) Date of Patent: Dec. 13, 2016

(54) IMAGE FORMING APPARATUS AND METHOD FOR SAVING RESOURCES AND IMPROVING USER FRIENDLINESS

(71) Applicant: Zhuhai Pantum Electronics Co., Ltd., Zhuhai (CN)

(72) Inventor: Jinliang Dong, Zhuhai (CN)

(73) Assignee: Zhuhai Pantum Electronics Co., Ltd. (CN)

( * ) Notice: Subject to any disclaimer, the term of this patent is extended or adjusted under 35 U.S.C. 154(b) by 0 days.

(21) Appl. No.: 14/652,015

(22) PCT Filed: Nov. 15, 2013

(86) PCT No.: PCT/CN2013/087274
§ 371 (c)(1),
(2) Date: Jun. 12, 2015

(87) PCT Pub. No.: WO2014/090069
PCT Pub. Date: Jun. 19, 2014

(65) Prior Publication Data
US 2015/0326745 A1 Nov. 12, 2015

(30) Foreign Application Priority Data
Dec. 13, 2012 (CN) .......................... 2012 1 0541333

(51) Int. Cl.
*H04N 1/00* (2006.01)
*G06F 3/12* (2006.01)

(52) U.S. Cl.
CPC ............ *H04N 1/00204* (2013.01); *G06F 3/12* (2013.01); *H04N 1/00278* (2013.01);
(Continued)

(58) Field of Classification Search
CPC ................................................ H04N 1/00204
(Continued)

(56) References Cited

U.S. PATENT DOCUMENTS 5,507,003 A * 4/1996 Pipkins ................. G06F 3/1293
358/1.15
5,918,088 A * 6/1999 Rikima .............. H04N 1/32128
358/1.16
(Continued)

FOREIGN PATENT DOCUMENTS

CN 1190752 A 8/1998
CN 1864165 A 11/2006
(Continued)

OTHER PUBLICATIONS

International Search Report for Application No. PCT/CN2013/087274 dated Feb. 20, 2014.

*Primary Examiner* — Jacky X Zheng
(74) *Attorney, Agent, or Firm* — Lerner, David, Littenberg, Krumholz & Mentlik, LLP (57) ABSTRACT

An image forming apparatus and a method thereof are disclosed. The image forming apparatus comprises: a first interface unit, which includes a first port and a second port, respectively used for establishing a first channel and a second channel between the image forming apparatus and a driving device of the image forming apparatus; an imaging controller, used for receiving data from the first channel as page data to be imaged, and acquiring data from the second channel as virtual data; and a timer, used for calculating a first duration from a last time when the image forming apparatus receives either page data from the first channel or virtual data from the second channel, whichever comes later, wherein when the first duration reaches a first predetermined duration, the imaging controller performs timeout handling for ceasing a present imaging job. The image forming apparatus can save resources and improve user friendliness.

12 Claims, 3 Drawing Sheets

(52) U.S. Cl.
CPC . *H04N 1/00888* (2013.01); *H04N 2201/0082* (2013.01); *H04N 2201/0093* (2013.01); *H04N 2201/0094* (2013.01)

(58) Field of Classification Search
USPC .............................................. 358/1.15, 1.13
See application file for complete search history.

(56) References Cited

U.S. PATENT DOCUMENTS

| | | |
|---|---|---|
| 7,675,638 B2 | 3/2010 | Czyszczewski et al. |
| 2005/0128508 A1 | 6/2005 | Greeff et al. |
| 2007/0195360 A1 | 8/2007 | Sagata |
| 2008/0198407 A1 | 8/2008 | Fukudome |
| 2012/0212777 A1* | 8/2012 | Honda .................... G06F 3/121 358/1.15 |

FOREIGN PATENT DOCUMENTS

| | | |
|---|---|---|
| CN | 101246416 A | 8/2008 |
| CN | 101405754 A | 4/2009 |
| CN | 103067641 A | 4/2013 |
| CN | 203057295 U | 7/2013 |

\* cited by examiner

IMAGE FORMING APPARATUS AND METHOD FOR SAVING RESOURCES AND IMPROVING USER FRIENDLINESS

CROSS REFERENCE TO RELATED APPLICATIONS

The present application is a national phase entry under 35 U.S.C. §371 of International Application No. PCT/CN2013/087274, filed Nov. 15, 2013, which claims priority from Chinese Patent Application No. 201210541333.6, filed Dec. 13, 2012, all of which are hereby incorporated herein by reference.

FIELD OF THE INVENTION

The present disclosure relates to the field of image forming, such as print imaging and the like, and in particular, to an image forming apparatus and an image forming method.

BACKGROUND OF THE INVENTION

An image forming apparatus usually prints data to be imaged provided by an information processing unit, such as a computer (a driving device for short in the present disclosure), on a recording medium. Such image forming apparatus can be a photocopier, a printer, a fax machine, or a multi-function peripheral (MFP) which synthesizes the functions of a photocopier, a printer, and a fax machine into a single system.

Generally, upon input of a PRINT command by a user, a printer driver arranged on the driving device would start transforming the user's document data into data to be imaged that can be identified by the image forming apparatus. Such data transformation as described above is usually termed a data rendering procedure. The driving device will not send a data page to be imaged to the image forming apparatus via a print interface until document data on said page is completely rendered. After the image forming apparatus receives the data to be imaged from the interface unit of the driving device, an imaging control unit of the image forming apparatus will parse the data to be imaged and transmit the parsed data to a print engine, which can output the parsed data on the recording medium.

A document usually contains pages of different levels of complexity, and therefore requires different data rendering durations for data of different pages. Generally, a data page of low complexity requires a relatively short data rendering duration, while a data page of high complexity requires a relatively long data rendering duration. Since the driving device will not send a data page to the image forming apparatus until said data page is completely rendered, where a data page is of relatively high complexity and therefore requires a relatively long rendering duration, the driving device will not send any data to the image forming apparatus for a long time. On the other hand, the image forming apparatus is provided with such protection mechanism that if no data are received from the driving device for a long time, the image forming apparatus will make a decision of timeout. As a result, the image forming apparatus will regard any data received as being useless and therefore discard the data, including the data of a current imaging job. In severe conditions, all data pages of high complexity in a user's document will be mistakenly deleted by the image forming apparatus, instead of being normally printed, which is a waste of resources and seriously affects use thereof.

SUMMARY OF THE INVENTION

One of the technical problems to be solved by the present disclosure is to provide a resource-saving and user friendly image forming apparatus and a method thereof.

In order to solve the above technical problem, the present disclosure provides an image forming apparatus. The apparatus comprises: a first interface unit, which includes a first port and a second port, respectively used for establishing a first channel and a second channel between the image forming apparatus and a driving device of the image forming apparatus; an imaging controller, used for receiving data from the first channel as page data to be imaged, and acquiring data from the second channel as virtual data; and a timer, used for calculating a first duration from a last time when the image forming apparatus receives either page data from the first channel or virtual data from the second channel, whichever comes later, wherein when the first duration reaches a first predetermined duration, the imaging controller performs timeout handling for ceasing a present imaging job.

In the image forming apparatus according to a first aspect of the present disclosure, the image controller is further used for: acquiring the data from the second channel; judging whether the data acquired from the second channel conform to a pre-established rule; and determining the data acquired to be virtual data, if the data are judged to conform to the pre-established rule.

In the image forming apparatus according to another aspect of the present disclosure, the pre-established rule prescribes that the data acquired comprise A, B, C, or D, or alternatively comprise D and any one of A, B, and C, among which, A represents any one of a pre-established group of data, or a pre-established datum; B represents data generated in accordance with a pre-established random number generation rule; C represents pre-established attribute information of an imaging job, including at least one selected from a group consisting of name, type of document, creator, sequence of current page data, size and creation time of the current page data of the imaging job; and D represents encrypted data obtained by encrypting above A, B, or C with a specified key.

In the image forming apparatus according to still another aspect of the present disclosure, the pre-established rule prescribes that the data acquired comprise A, B, C, or D, or alternatively comprise D and any one of A, B, and C, and the data acquired further comprise a virtual data identifier.

In the image forming apparatus according to another aspect of the present disclosure, the first interface unit is in the form of any one selected from a group consisting of a USB interface, a parallel interface, and a network communication interface.

The image forming apparatus according to a still another aspect of the present disclosure further comprises a storage unit, which has a first buffer and a second buffer, respectively used for caching data from the first channel and the second channel.

According to a further aspect of the present disclosure, an image forming method of an image forming apparatus is provided. The method comprises the steps of: establishing a first channel and a second channel between the image forming apparatus and a driving device of the image forming apparatus, using a first port and a second port of the image forming apparatus, respectively; receiving data from the first channel as page data to be imaged, and acquiring data from the second channel as virtual data; and calculating a first duration from a last time when the image forming apparatus receives either page data from the first channel or virtual data from the second channel, whichever comes later, wherein when the first duration reaches a first predetermined duration, an imaging controller performs timeout handling for ceasing a present imaging job.

The step of acquiring data from the second channel as virtual data further comprises: acquiring the data from the second channel; judging whether the data acquired from the second channel conform to a pre-established rule; and determining the data acquired to be virtual data, if the data are judged to conform to the pre-established rule.

Preferably, the pre-established rule prescribes that the data acquired comprise any one of A, B, C, and D, or alternatively comprise D and any one of A, B, and C, among which, A represents any one of a pre-established group of data, or a pre-established datum; B represents data generated in accordance with a pre-established random number generation rule; C represents pre-established attribute information of an imaging job, including at least one selected from a group consisting of name, type of document, creator, sequence of current page data, size and creation time of the current page data of the imaging job; and D represents encrypted data obtained by encrypting above A, B, or C with a specified key. Besides, the pre-established rule can also prescribe that the data acquired comprise a virtual data identifier and any one of A, B, C, and D, or alternatively comprise a virtual data identifier, D, and any one of A, B, and C.

According to still another aspect of the present disclosure, an image forming method is further provided. The method comprises the steps of: generating virtual data, used for preventing an image forming apparatus from ceasing a current imaging job due to failure of receiving any data within a first predetermined duration; establishing a first channel and a second channel with the image forming apparatus; and transmitting page data acquired by rendering document data to be imaged to the image forming apparatus via the first channel, and transmitting virtual data to the image forming apparatus via the second channel. And the step of generating virtual data further comprises generating the virtual data in accordance with a pre-established rule.

The pre-established rule can prescribe that the virtual data comprise any one of A, B, C, and D, or alternatively comprise D and any one of A, B, and C, among which, A represents any one of a pre-established group of data, or a pre-established datum; B represents data generated in accordance with a pre-established random number generation rule; C represents pre-established attribute information of an imaging job, including at least one selected from a group consisting of name, type of document, creator, and creation time of the imaging job; and D represents encrypted data obtained after encrypting above A, B, or C with a specified key.

The pre-established rule can prescribe that the virtual data comprise a virtual data identifier and any one of A, B, C, and D, or alternatively comprise a virtual data identifier, D, and any one of A, B, and C.

The step of transmitting virtual data to the image forming apparatus via the second channel comprises transmitting the virtual data to the image forming apparatus via the second channel in any one of the following occasions: when the current imaging job begins; or a second predetermined duration passes after the current imaging job begins, the second predetermined duration being shorter than or equal to the first predetermined duration; and when a first timeout occurs in a rendering step of the current imaging job.

The step of transmitting virtual data to the image forming apparatus via the second channel can specifically comprise: transmitting the virtual data continuously or periodically at intervals shorter than or equal to the first predetermined duration, after the virtual data are first sent to the image forming apparatus via the second channel.

Moreover, transmission of virtual data to the image forming apparatus via the second channel can be ceased upon completely rendering the current printing job, transmission of all page data, or cancellation of the current printing job.

In addition, supervisory control can be further performed, so as to cease to transmit virtual data to the image forming apparatus and perform exception handling of the imaging job, upon excess of a third predetermined duration in rendering one data page, excess of a fourth predetermined duration for the current imaging job, and/or occurrence of abnormality during communications with the image forming apparatus.

Compared with the prior art, one or more embodiments of the present disclosure can bring about the following advantages. In the prior art, transmission of page data and virtual data via one and the same channel causes data concurrent problems. According to the present disclosure, however, such problems no longer exist. As a result, handling complexity can be resolved. In other words, the present disclosure allows concurrent transmission of page data and virtual data, rendering it unnecessary to avoid occurrence thereof.

Other features and advantages of the present disclosure will be further explained in the following description, and partly become self-evident therefrom, or be understood through implementing the present disclosure. The objectives and advantages of the present disclosure will be achieved through the structure specifically pointed out in the description, claims, and the accompanying drawings.

BRIEF DESCRIPTION OF THE DRAWINGS

The drawings are provided for further understanding of the present disclosure, and constitute one part of the description. They serve to explain the present disclosure in conjunction with the embodiments, rather than to limit the present disclosure in any manner. In the drawings.

DETAILED DESCRIPTION OF THE EMBODIMENTS

The present disclosure will be explained in details with reference to the embodiments and the accompanying drawings, whereby it can be fully understood how to solve the technical problem by the technical means according to the present disclosure and achieve the technical effects thereof, and thus the technical solution according to the present disclosure can be implemented. It is important to note that as long as there is no structural conflict, all the technical features mentioned in all the embodiments may be combined together in any manner, and the technical solutions obtained in this manner all fall within the scope of the present disclosure.

In addition, the steps as illustrated in the flow chart of the accompanying drawings can be executed in a computer system under, for example, a set of computer-executable instructions. Furthermore, despite the logical order indicated in the flow chart, the steps as shown or described can, in some circumstances, be executed in an order different from the logical order shown in the flow chart.

The inventor of the present disclosure has proposed a method for solving the above problem by transmitting virtual data to an image forming apparatus via a driving device. Besides, the method of the present disclosure may not only solve the above technical problem of incapability of correct print, but also enable the image forming apparatus to perform printing immediately upon receipt of page data, without having to judge whether the data received are virtual page or page data, thereby simplifying firmware development and reducing costs thereof. As a result, page data can be printed with enhanced efficiency.

Figure 1:
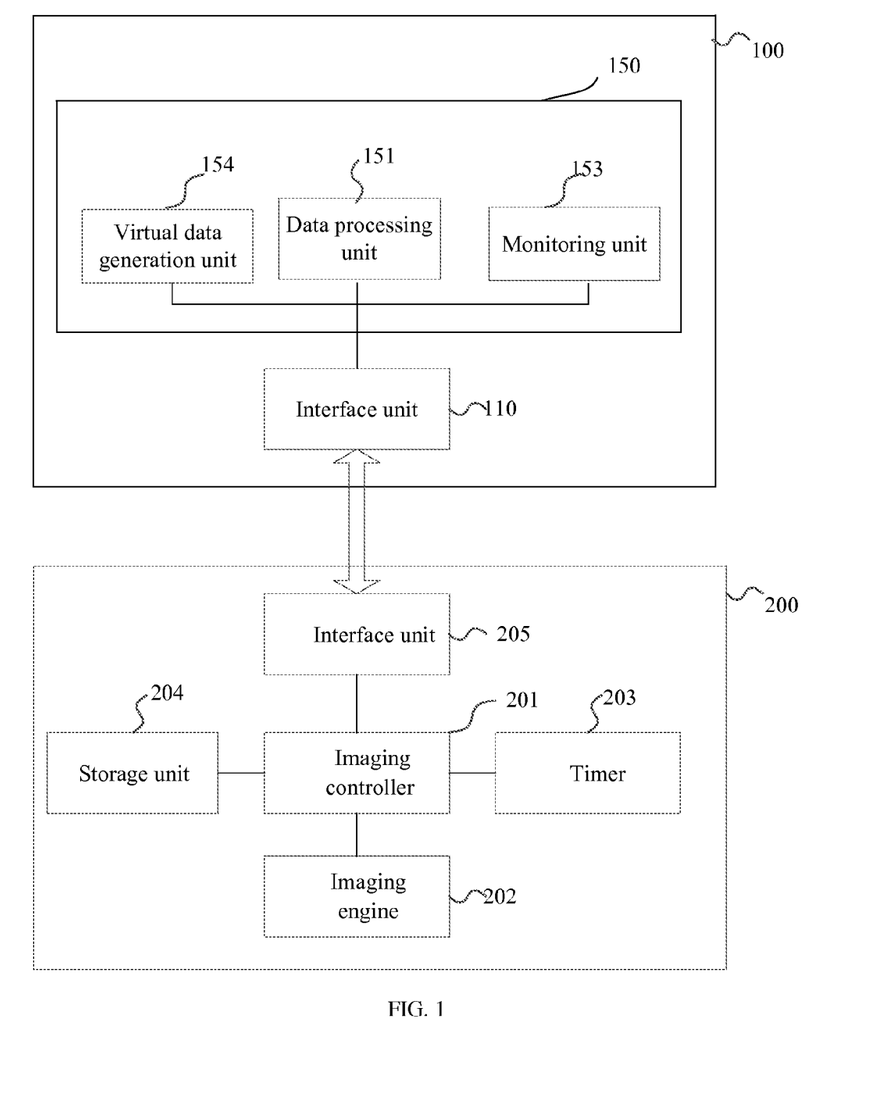
FIG. 1 schematically shows a functional and structural module of an image forming system according to the embodiments of the present disclosure.

FIG. 1 schematically shows a functional and structural module of an image forming system according to the embodiments of the present disclosure.

The image forming system according to the embodiments of the present disclosure comprises an image forming apparatus 200 and a driving device 100 for the image forming apparatus. The driving device 100 can transform a user's document data into page data to be imaged, and transmit the page data to the image forming apparatus 200. The image forming apparatus 200 will print the page data transmitted from the driving device 100 on a recording medium.

The driving device 100 and the image forming apparatus 200 can be directly connected to each other via a communication line which can satisfy the requirements of a USB interface, a parallel interface, and the like, and can perform data communications with each other via a network communication interface also.

The driving device 100 comprises a data controller 150 and an interface unit 110 (also referred to as a second interface unit). From a hardware perspective, the data controller 150 can be constituted by combining a controller (such as a central processing unit (CPU) or a micro control unit (MCU)), a memory, and an application stored in the memory. Functionally, the data controller 150 can comprise a data processing unit 151, a monitoring unit 153, and a virtual data generation unit 154. For the sake of convenience, the data controller 150 will be explained in detail in the following from a functional perspective. Those skilled in the art can appreciate that the data processing unit, the monitoring unit, and the virtual data generation unit can be realized by arranging shared hardware such as a central controller or a memory, or separate hardware such as MCUs and the like.

The data processing unit 151 can control rendering of document data, transmission and reception of page data to be imaged, generation and transmission of virtual data, and communications between the driving device 100 and the image forming apparatus 200.

The monitoring unit 153 can be used for monitoring a rendering procedure of document data, and transmission and reception procedures of page data to be imaged in the data processing unit 151, and will take appropriate exception-handling measures at occurrence of an anomaly.

The virtual data generation unit 154 can be used for generating virtual data, which are used for preventing the image forming apparatus from ceasing a current imaging job due to failure of receiving any data within a first predetermined duration.

The interface unit 110 can be in the form of any one selected from a group consisting of a USB interface, a parallel interface, and a network communication interface, and a first channel and a second channel will be established between the interface unit 110 and the image forming apparatus 200. Data communications can be performed between the driving device 100 and the image forming apparatus 200 via the first channel and the second channel of the interface unit 110.

Thus, the data controller 150 of the driving device 100 can transmit page data obtained by rendering the document data to be imaged to the image forming apparatus 200 via the first channel, and virtual data to the image forming apparatus 200 via the second channel. This will be illustrated in detail in the following.

The image forming apparatus 200 can include an imaging controller 201, an interface unit 205, a timer 203, an imaging engine 202, and a storage unit 204.

The interface unit 205 (also referred to as a first interface unit) can include a first port and a second port, respectively used for establishing the first channel and the second channel between the image forming apparatus 200 and the driving device 100 thereof. Thus, concurrent data communications can be performed between the interface unit 205 of the image forming apparatus 200 and the interface unit 110 of the driving device 100 through the first channel and the second channel, respectively. In other words, data transmission can be performed both in the first channel and the second channel at the same time, without interrupting each other. The interface unit 205 can be correspondingly selected from a group consisting of a USB interface, a parallel interface, and a network communication interface, so as to be coupled to the interface unit 110.

The imaging controller 201 will receive data from the first channel established between the driving device 100 and the image forming apparatus 200 as page data to be imaged, and receive data from the second channel established between the driving device 100 and the image forming apparatus 200 as virtual data. More specifically, the imaging controller 201 can control a printing procedure of the image forming apparatus 200, each unit connected to the imaging controller 201, and communications between the image forming apparatus 200 and the driving device 100.

The imaging engine 202 can perform an imaging procedure on page data to be imaged that have been received from the first channel. More specifically, the imaging engine 202 can receive print data from the imaging controller 201, and print the print data onto the recording medium under the control of the imaging controller 201.

The storage unit 204 can store both virtual data and page data to be imaged that have been received from the driving device 100, and a control program that can realize various functions.

The timer 203 can calculate a first duration from a last time when the image forming apparatus 200 receives either page data from the first channel or virtual data from the second channel, whichever comes later. When the first duration reaches a first predetermined duration, the imaging controller 201 performs a timeout handling for ceasing a present imaging job. The first predetermined duration is pre-established in the image forming apparatus 200, and can be fixed or established by the supplier of the image forming apparatus or by a user.

Such being the case, the image forming apparatus 200 can perform printing immediately after receiving page data from the first channel, without having to judge whether the data transmitted from the driving device 100 are virtual data or page data, since virtual data will be transmitted from the second channel instead of the first channel. As a result, firmware development of the image forming apparatus can be simplified and costs thereof can be reduced.

Preferably, the storage unit 204 of the image forming apparatus 200 can further comprise a first buffer and a second buffer, respectively used for caching data from the first channel and the second channel. This can further accelerate response of the image forming apparatus 200 to the data received. The capacity of the first buffer can be much larger than that of the second buffer.

Figure 2:
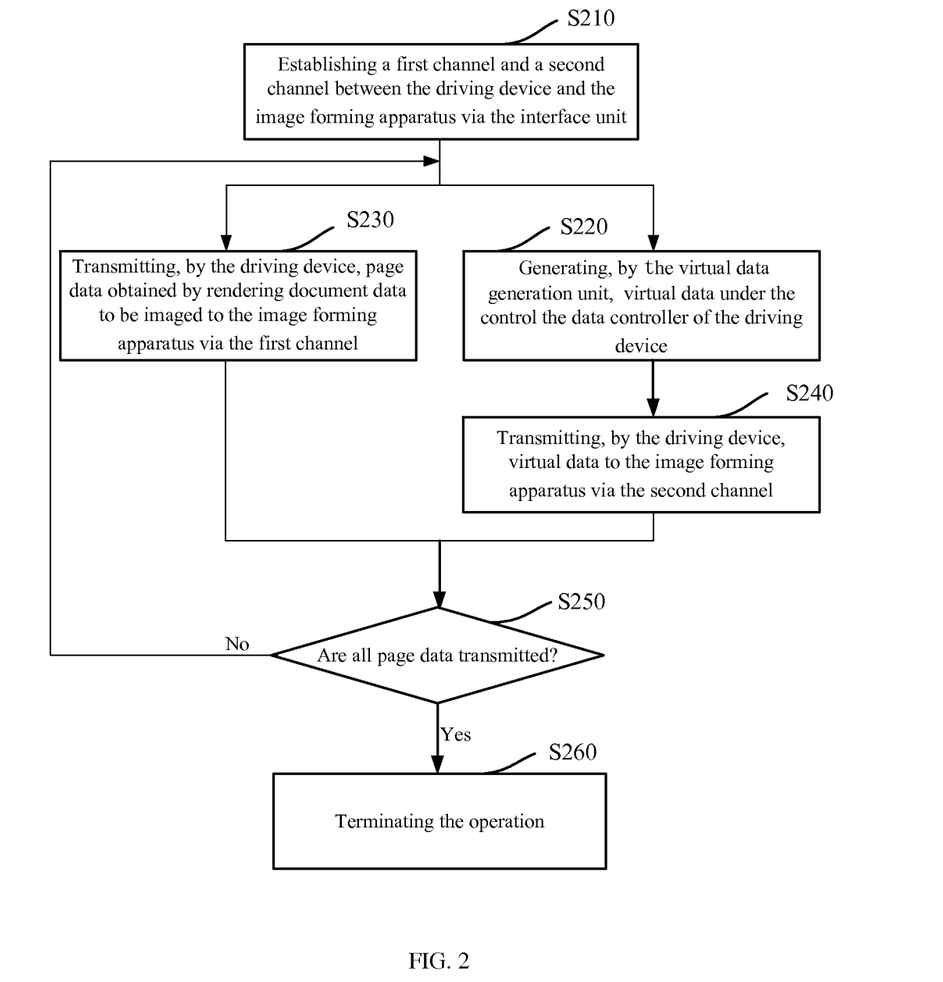
FIG. 2 shows a flow chart of an image forming method with reference to a driving device according to an embodiment of the present disclosure.

FIG. 2 shows a flow chart of an image forming method with respect to the driving device 100 according to an embodiment of the present disclosure. The steps as depicted in FIG. 2 will be explained in detail as follows.

In step S210, the driving device 100 and the image forming apparatus 200 are connected. A first channel and a second channel are established between the driving device 100 and the image forming apparatus 200 via the interface unit 110.

In step S220, the virtual data generation unit 154 generates virtual data under the control of the data processing unit 151 of the data controller 150. The virtual data are used for preventing the image forming apparatus 200 from ceasing a current imaging job due to failure of receiving any data within the first predetermined duration.

In step S230, the driving device 100 transmits page data obtained by rendering document data to be imaged to the image forming apparatus 200 via the first channel. More specifically, when a PRINT command input by a user is received, the document data to be imaged will be determined according to the PRINT command of the user, and rendered by page to obtain page data. When a data page is obtained through rendering, the driving device 100 will transmit the data page to the image forming apparatus 200 via the first channel.

More specifically, the data processing unit 151 of the data controller 150 will be ready to render the user's document data by page. After a data page is completely rendered, the data processing unit 151 will transmit the rendered data page to the image forming apparatus 200 via the first channel established via the interface unit 110.

In step S240, the driving device 100 transmits virtual data to the image forming apparatus 200 via the second channel. The second channel is different from the first channel for transmitting page data, and can be used for transmitting virtual data only, or virtual data and other data simultaneously.

In step S250, it is judged whether page data are all transmitted. If yes, the operation proceeds to step S260 and is terminated. The data processing unit 151 ceases transmission of virtual data to the image forming apparatus 200. Otherwise, the operation returns to steps S230 and S220. For example, it can be determined whether all page data are transmitted by judging whether the monitoring unit 153 receives a notification that data transmission has been completed from the data processing unit 151.

Figure 3:
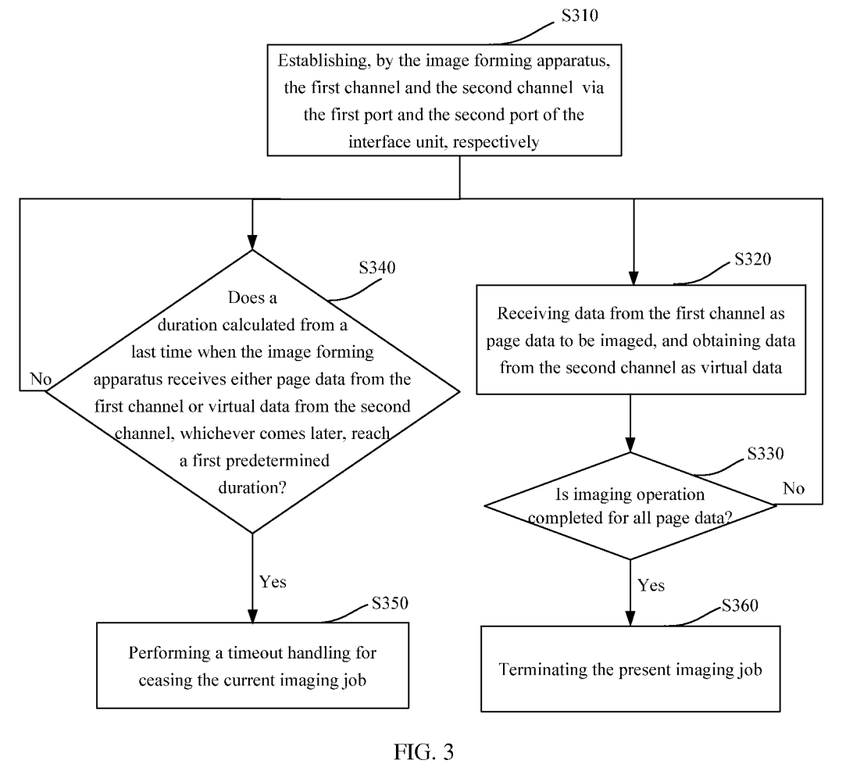
FIG. 3 shows a flow chart of an image forming method with reference to an image forming apparatus according to an embodiment of the present disclosure.

FIG. 3 shows a flow chart of an image forming method with respect to the image forming apparatus 200 according to an embodiment of the present disclosure. The steps as depicted in FIG. 3 will be explained in detail as follows.

In step S310, with reference to the image forming apparatus 200, in correspondence with step S210 with reference to the driving device 100, the first channel and the second channel are established between the image forming apparatus 200 and the driving device 100 via the first port and the second port of the interface unit 205.

In step S320, the image forming apparatus 200 receives data from the driving device 100 via the interface unit 205. Specifically, the imaging controller 201 receives data from the first channel as page data to be imaged, and obtains data from the second channel as virtual data.

After being handled by the imaging controller 201, the page data to be imaged that have been received from the first channel are transmitted to the imaging engine 202 for an imaging procedure, so as to be printed on the recording medium.

In step S330, it is judged whether the imaging operation has been completed for all page data. If yes, the current imaging operation proceeds to step S360 and is terminated. Otherwise, the operation returns to steps S320 and S340.

In step S340, the imaging controller 201 judges whether a duration calculated from a last time when the image forming apparatus 200 receives either page data from the first channel or virtual data from the second channel, whichever comes later, reaches the first predetermined duration. If yes, the operation proceeds to step S350; while if no, the operation returns to steps S320 and S340, and data from the driving device 100 continue to be received.

In step S350, the imaging controller 201 performs a timeout handling for ceasing the current imaging job.

In the following, some steps of the present embodiment will be further introduced with reference to the flow charts as indicated in FIGS. 2 and 3.

In step S240, particularly, virtual data can be transmitted to the image forming apparatus 200 via the second channel when the current imaging job begins, or alternately when a second predetermined duration after the current imaging job begins passes, wherein the second predetermined duration can be predetermined or preset, and is shorter than or equal to the first predetermined duration.

In addition, transmission of virtual data to the image forming apparatus 200 can be started during a rendering procedure of the current job upon first occurrence of a timeout. That is, the monitoring unit 153 can measure a rendering time for each data page and compare the rendering time for each data page with a predetermined rendering time limit, and transmission of virtual data to the image forming apparatus 200 will be started at the first time when the rendering time for a data page reaches the predetermined rendering time limit, which is called as rendering timeout. As can be conceived, the time sequence of steps S220 and S230 depicted in FIG. 2 only constitutes an example, and steps S220 and S230 can be performed in any order or even simultaneously.

After transmission of virtual data to the image forming apparatus 200 is started via the second channel, the virtual data can be transmitted to the image forming apparatus 200 either continuously, or periodically at intervals shorter than or equal to the first predetermined duration. Specifically, the data processing unit 151 can transmit virtual data to the image forming apparatus 200 via the second channel of the interface unit 110 in a periodic manner at intervals shorter than or equal to the first predetermined duration. The data processing unit 151 can also transmit virtual data to the image forming apparatus 200 via the second channel of the interface unit 110 in a continuous manner. Since the data processing unit 151 transmits page data and virtual data to the image forming apparatus 200 through different channels, concurrent transmission of the page data and the virtual data is allowable. In the prior art, transmission of page data and virtual data via one and the same channel causes data concurrent problems. According to the present disclosure, however, such problems no longer exit. This enables the image forming method of the present disclosure to resolve handling complexity.

In addition, in the image forming method with reference to the driving device 100, it is also possible to add a monitoring step of data processing, for monitoring whether there is occurrence of errors during a handling procedure of the imaging job. If yes, an exception handling can be performed during the imaging job, such as relevant handling for ceasing the current imaging job, and releasing corresponding hardware and software resources, etc. Monitoring will also be performed to facilitate cease of virtual data transmission to the image forming apparatus 200 through the second channel upon complete rendering of the current printing job, transmission of all page data, or cancellation of the current printing job.

The monitoring unit 153 can perform timing on the rendering of a data page. That is, the monitoring unit 153 can start timing upon receipt of a notice of beginning rendering a data page transmitted by the data processing unit 151. If a notice of complete rendering of the data page is not received within a predetermined duration Tout 1 (a third predetermined duration) from the data processing unit 151, the monitoring unit 153 will determine that an error occurs in rendering the data page, and notify the data processing unit 151 that transmission of virtual data to the image forming apparatus 200 should be ceased. Tout 1 represents a longest time period allowable for generating a single data page by the data processing unit 151.

The monitoring unit 153 can perform timing on the rendering of an imaging job also. That is, the monitoring unit 153 will start timing upon receipt of a notice of beginning rendering an imaging job transmitted by the data processing unit 151. If a notice of complete rendering of the imaging job is not received within a predetermined duration Tout 2 (a fourth predetermined duration) from the data processing unit 151, the monitoring unit 153 will determine that an error occurs in rendering the current imaging job, and notify the data processing unit 151 that transmission of virtual data to the image forming apparatus 200 should be ceased. Tout 2 represents a longest time period allowable for rendering an imaging job. Tout 1 and Tout 2 can be predefined, or can be established by a user as the printing condition actually requires.

The monitoring unit 153 can also monitor whether there are communication errors between the driving device 100 and image forming apparatus 200, and notify the data processing unit 151 that transmission of virtual data to the image forming apparatus 200 should be ceased, if yes.

Furthermore, in step S220, virtual data can be generated by the virtual data generation unit 154 preferably in accordance with a pre-established rule. Correspondingly, obtaining data from the second channel as virtual data in step S320 can preferably comprises: obtaining data from the second channel, judging whether the data obtained from the second channel satisfy the pre-established rule, and regarding the data obtained as virtual data if the pre-established rule is determined to be satisfied thereby.

Virtual data are generated according to a pre-established rule, which can facilitate identification of virtual data by the image forming apparatus 200 according to the pre-established rule, and transmission of other data in the second channel, and prevent malicious transmission or manipulation of the virtual data.

The pre-established rule can prescribe that the virtual data should include any one of a predetermined set of data or a pre-established datum (rule A for short).

Virtual data can be preset data, for example, data with both content and length fixed or predetermined. For example, a fixed set of data can be pre-stored in the virtual data generation unit 154 as static virtual data, such as 0B320000. When it requires transmission of the virtual data to the image forming apparatus 200, the data processing unit 151 can read the static virtual data from the virtual data generation unit 154 and transmit the static virtual data to the image forming apparatus 200 through the interface unit 110. The virtual data under this circumstance are referred to as static virtual data. When the image forming apparatus 200 acquires the data through the second channel, it will judge whether the acquired data comply with a corresponding pre-established rule. In the present embodiment, it will be judged whether the received data are those with both content and length fixed or predetermined. If not, the acquired data will not be regarded as virtual data, whereas if yes, they will be regarded as virtual data.

Furthermore, virtual data can be any one datum of a set of data. Such being the case, every time virtual data are to be transmitted, the virtual data generation unit 154 can regard any one datum of a predetermined set of data as virtual data that are generated thereby and to be transmitted to the image forming apparatus 200. A datum can be selected from the predetermined set of data through various manners. For example, a datum can be selected from the predetermined set of data in a successive and circulating manner, or even in a random manner, and then transmitted to the image forming apparatus 200 as generated virtual data. As can be conceived, a datum can be selected from the predetermined set of data in any manner.

In addition, the pre-established rule can also specify that the virtual data are generated according to a pre-established random number generation rule (rule B for short). The pre-established random number generation rule can be arbitrary, as long as it is consistent with respect to both the driving device 100 and the image forming apparatus 200. This also causes virtual data to vary during a handling procedure of one and the same job, and even causes the virtual data generation unit 154 to generate different virtual data from one time to another. For example, it can be assumed that the virtual data are a set of 8-bit data, and the virtual data generation unit 154 can be configured as generating 8-bit data in a random manner following the pre-established random number generation rule. When virtual data are periodically transmitted to the image forming apparatus 200 by the data processing unit 151, virtual data transmitted in different periods are subject to dynamic variation. After having acquired data through the second channel, the image forming apparatus 200 will judge whether the acquired data comply with a corresponding pre-established rule. In this embodiment, it will be determined whether the received data satisfy the pre-established random number generation rule. If not, the acquired data will not be regarded as virtual data, while if yes, they will be regarded as virtual data.

In order to further enhance security in communications, and prevent virtual data from being identified and maliciously used by a third party, the pre-established rule can also specify that the virtual data comprise pre-established attribute information of an imaging job, including at least one selected from a group consisting of name, type of document, creator, sequence of current page data, size and creation time of the current page data of the imaging job (rule C for short). In this manner, the virtual data can be subject to dynamic variations during different imaging jobs with the information of name, document type, and creation of different imaging jobs, or even with the information of sequence of current page data, size of the current page data, and the like during a handling procedure of one and the same imaging jobs, so as to effectively facilitate safe communications between the driving device 100 and image forming apparatus 200. In this case, the image forming apparatus 200 can determine whether acquired data are virtual data by judging whether the acquired data comply with a corresponding pre-established rule in a similar manner.

For instance, it can be assumed that the virtual data comprise four parts, which vary with the name, the document type, the creation time, and the creator of an imaging job, respectively. After receiving a PRINT command input by a user, the data processing unit 151 will first determine the document type of a current job, record creation time, creator, and name of the current imaging job, and transmit such attribute information to the image forming apparatus 200 before starting the current imaging job. The image forming apparatus 200 will receive the attribute information of the imaging job, and store the information in the storage unit 204. During a handling procedure of the job, when virtual data are to be transmitted to the image forming apparatus 200, the data processing unit 151 will transmit the information of name, document type, creator, and creation time of the imaging job to the virtual data generation unit 154, which will vary the information of the above four parts according to the attribute information, and generate virtual data accordingly. The data processing unit 151 will transmit the virtual data generated to the image forming apparatus 200, which, after having acquired data through the second channel, will judge whether the data acquired comply with a corresponding pre-established rule. In the present embodiment, it will be judged whether the data acquired comprise the four parts, and whether the value of each part is correct. If not, the data obtained will not be regarded as virtual data. The timer 203 will then not be triggered for reset. Otherwise, if yes, the data obtained will be regarded as virtual data, and thus the timer 203 will be triggered for reset.

Besides, the pre-established rule can also specify regarding encrypted data obtained after encrypting the virtual data generated in accordance with above pre-established rule A, B, or C as virtual data finally to be transmitted to the image forming apparatus 200 (rule D for short). Thus, after having acquired data through the second channel, the image forming apparatus 200 will judge whether the data acquired comply with a corresponding pre-established rule. In this embodiment, it will be determined whether the data acquired comply with a corresponding pre-established rule by judging whether the data acquired after being decrypted conform to one of the above pre-established rules agreed between the driving device 100 and the image forming apparatus 200. If not, the data acquired will not be regarded as virtual data; while if yes, they will be regarded as virtual data. In this case, an encryption key can be pre-stored in both the driving device 100 and the image forming apparatus 200. Virtual data can be first generated with data generated by the virtual data generation unit 154 using the encryption key and a predetermined encryption rule, and then transmitted to the image forming apparatus 200. The image forming apparatus 200 will decrypt the virtual data received according to a pre-stored key, and then determine whether the decrypted data are expected virtual data by judging whether they satisfy rule A, B, or C agreed between the image forming apparatus 200 and the driving device 100. If not, the data received might have been tampered and therefore should not be regarded as virtual data by the image forming apparatus 200. As such, the timer 203 will not be trigged for reset.

Moreover, the pre-established rule can also specify that virtual data can comprise data acquired according to rule D and pre-encrypted data generated according to any one of pre-established rules A, B, and C (rule E for short). That is, according to this pre-established rule, virtual data can include both pre-encrypted data and encrypted data. Thus, with respect to the image forming apparatus 200, an arithmetic procedure corresponding to the encryption procedure in rule D can be performed to the data received. It can be determined whether the data received are expected virtual data through comparison between the resulting data of the arithmetic procedure and the pre-encrypted or encrypted data. It can then be further judged whether the timer 203 is to be triggered for reset. In this case, an encryption key can be pre-stored in both the driving device 100 and the image forming apparatus 200. Pre-encrypted data generated by the virtual data generation unit 154 can be used to produce encrypted data with the encryption key and a predetermined encryption rule. The pre-encrypted data and encrypted data can then be transmitted to the image forming apparatus 200 together as virtual data. The image forming apparatus 200 can obtain a decryption result through a decryption operation on the encrypted data contained in the received data using a pre-stored key, and judge whether the decryption result is consistent with the pre-encrypted data contained in the received that. If yes, the received data can be proved to be virtual data. The image forming apparatus 200 can also call a program corresponding to the encryption rule and perform an encryption operation on the pre-encrypted data contained in the received data using a pre-stored key to obtain an encryption result, and judge whether the encryption result is consistent with the encrypted data contained in the received data. If yes, the received data can be proved as expected virtual data.

In addition, the pre-established rule can also specify that the virtual data according to any one of rules A to E as described above can be incorporated with a virtual data identifier, so as to form virtual data finally to be transmitted to the image forming apparatus 200 (rule F for short). The virtual data identifier can be used for distinguishing the virtual data from other types of data transmitted in one and the same channel. Thus, after having received the data, the image forming apparatus 200 will first determine whether the data received are virtual data based on the virtual data identifier, and then determine whether other portions of the data are also consistent with any one of the pre-established rules A, B, C, D, and E that has been pre-agreed with the driving device 100. If it is determined that the data received from the second channel do not include any virtual data identifier or that other portions of the data except the virtual data identifier do not conform to any one of rules A, B, C, D, and E pre-agreed with the driving device 100, the data will not be regarded as virtual data. Hence, the timer 203 will not be triggered for reset.

Figure 4:
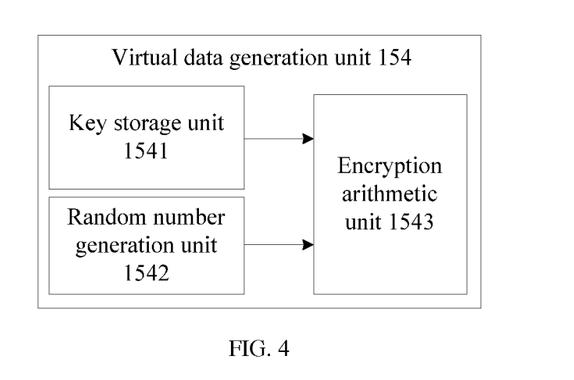
FIG. 4 schematically shows the structure of a virtual data generation unit according to an embodiment of the present disclosure.

FIG. 4 schematically shows the structure of a virtual data generation unit according to an embodiment of the present disclosure. When data to be encrypted are generated using rules E and B, and the encrypted data and the virtual data identifier are finally transmitted to the image forming apparatus 200 together as virtual data, the virtual data generation unit 154 can further include a key storage unit 1541, a random number generation unit 1542, and an encryption arithmetic unit 1543. The step of generating virtual data via an encryption manner will be further illustrated in connection with FIG. 4.

The key storage unit 1541 stores an encryption key K; the random number generation unit 1542 generates data Rt; and the encryption arithmetic unit 1543, controlled under the data processing unit 151, encrypts the key stored in the key storage unit 1541 and the data Rt generated by the random number generation unit 1542 through a predetermined encryption algorithm, to generate virtual data Dt.

The encryption algorithm adopted by the encryption arithmetic unit 1543 can be based on a Hash algorithm such as MD5, SHA1, SHA256, and SHA512, and can also be other encryption algorithms. Because the random number generation unit 1542 generates a series of dynamically changing data, encrypted data generated by the encrypting arithmetic unit 1543 are different each time, thereby improving the communication security.

Subsequently, encrypted data and the virtual data identifier together are transmitted by the driving device 100 to the image forming apparatus 200 through the second channel as final virtual data.

After having acquired data from the second channel, the image forming apparatus 200 will first judge whether the data acquired include a virtual data identifier. If not, it will be determined that the data acquired are not virtual data. On the contrary, if yes, the data acquired except the virtual data identifier will be analyzed. That is, the imaging controller 201 will call a program which corresponds to the encryption algorithm used by the encryption operation unit 1543 from the storage unit 204, and perform a decryption operation on an encrypted portion of the data acquired except the aforementioned virtual data identifier, using the key K stored in the storage unit 204, to obtain a decryption result.

When the data acquired comprise both a pre-encrypted portion and an encrypted portion, it will be determined whether the decryption result is consistent with the pre-encrypted portion of the data acquired. On the other hand, when the data acquired merely comprise an encrypted portion, it will be further judged whether the decryption result is consistent with data determined by any one of rules A to E pre-agreed with the driving device 100. If yes, it will be determined that the data acquired have not been tampered, and thus can be regarded as virtual data. The timer 203 will thus be reset. On the contrary, the data acquired should not be regarded as virtual data, and the timer therefore will not be reset.

According to the above data handling procedures, even if a third party intercepts the virtual data transmitted to the image forming apparatus 200 by the driving device 100, it will not acquire any real meaning of these virtual data due to lack of knowledge of the key employed by the image forming system of the present disclosure. Even if the virtual data are tampered by a third party, they can be identified by the image forming apparatus 200. Hence, communications between the driving device 100 and the image forming apparatus 200 can be secured, and virtual data can be prevented from being maliciously attacked and used by a third party.

It should be noted that, the term "receive" in the present disclosure generally means "having received", but is not limited thereto. It can also refer to any moment during the procedure of receiving, so long as the technical solution can be implemented.

The driving device 100 of the present disclosure can be a computing device, such as a computer arranged with a driving program for the image forming apparatus 200, a personal data application (PDA), a mobile intelligent terminal, etc. The key storage unit 1541, the random number generation unit 1542, and the encryption arithmetic unit 1543 of the virtual data generation unit 154 can be achieved by combining a memory, an encryption program, and a central controller of the computing device with one another, or by an peripheral that can get access to the computing device, such as an peripheral that can support a USB interface and can generate encrypted virtual data according to a pre-established rule. Thus, the privacy of the key can be improved.

The driving device 100 of the present disclosure can be achieved via the following steps. More specifically, a storage medium (or a recording medium) stored with a software program code used for achieving the function of the above embodiments can be used in a system or device. The computer (CPU or MPU) of the system or device can read and execute the program code stored in the storage medium. In the case, the function of the above embodiments can be achieved through the program code read out from the storage medium, and the storage medium of the program code constitutes the present disclosure. The function of the above embodiments can be achieved when the computer executes the program code that has been read out. In addition, the present disclosure comprises the following condition. The function of the driving device in the above embodiments can be achieved when a command based on a program code, such as an operation system (OS) and the like that are operating in a computer, performs a partial or complete actual handling.

In addition, the present disclosure comprises the following conditions. More specifically, the program code read out from the storage medium can be written in a memory inserted into a functional expansion card of the computer, or in a memory of a c unit connected to the computer. Subsequently, a CPU of the functional expansion card or a functional expansion unit performs a partial or complete handling based on a command of the program code, thereby achieving the function of the above embodiments. In short, the present disclosure further provides programs corresponding to the driving devices of the above embodiments, so that the computer can be used as the driving devices of the above embodiments for implementation the above methods of the present disclosure. The present disclosure further provides storage media for storing the programs. The above embodiments are described only for better understanding, rather than restricting, the present disclosure. Any person skilled in the art can make amendments to the implementing forms or details without departing from the spirit and scope of the present disclosure. The scope of the present disclosure should still be subject to the scope defined in the claims.

The invention claimed is:

1. An image forming apparatus, comprising:
   a first interface unit, which includes a first port and a second port, respectively used for establishing a first channel and a second channel between the image forming apparatus and a driving device of the image forming apparatus;
   an imaging controller used for receiving data from the first channel as page data to be imaged, and acquiring data from the second channel as virtual data used to prevent the image forming apparatus from ceasing a current imaging job; and
   a timer used for calculating a first duration from a last time when the image forming apparatus receives either page data from the first channel or virtual data from the second channel, whichever comes later, wherein when the first duration reaches a first predetermined duration, the imaging controller performs timeout handling for ceasing a present imaging job;

wherein the first interface unit, the imaging controller and the timer are controlled by a processor;

wherein the image controller is further used for:

acquiring the data from the second channel;

judging whether the data acquired from the second channel conform to a pre-established rule;

determining the data acquired to be virtual data, if the data are judged to conform to the pre-established rule; and wherein the pre-established rule prescribes that the data acquired comprise A, B, C, or D, or alternatively comprise D and any one of A, B, and C, among which:

A represents any one of a pre-established group of data, or a pre-established datum;

B represents data generated in accordance with a pre-established random number generation rule;

C represents pre-established attribute information of an imaging job, including at least one selected from a group consisting of name, type of document, creator, sequence of current page data, size and creation time of the current page data of the imaging job; and D represents encrypted data obtained by encrypting above A, B, or C with a specified key.

2. The image forming apparatus according to claim 1, wherein the pre-established rule prescribes that the data acquired comprise A, B, C, or D, or alternatively comprise D and any one of A, B, and C, and wherein the data acquired further comprise a virtual data identifier.

3. The image forming apparatus according to claim 1, wherein the first interface unit is in the form of any one selected from a group consisting of a USB interface, a parallel interface, and a network communication interface.

4. The image forming apparatus according to claim 1, further comprising a storage unit, which has a first buffer and a second buffer, respectively used for caching data from the first channel and the second channel.

5. An image forming method of an image forming apparatus, comprising the steps of:

establishing a first channel and a second channel between the image forming apparatus and a driving device of the image forming apparatus with a first port and a second port of the image forming apparatus, respectively;

receiving data from the first channel as page data to be imaged, and acquiring data from the second channel as virtual data used to prevent the image forming apparatus from ceasing a current imaging job; and calculating a first duration from a last time when the image forming apparatus receives either page data from the first channel or virtual data from the second channel, whichever comes later, wherein when the first duration reaches a first predetermined duration, an imaging controller performs timeout handling for ceasing a present imaging job;

wherein the step of acquiring data from the second channel as virtual data further comprises:

acquiring the data from the second channel;

judging whether the data acquired from the second channel conform to a pre-established rule;

determining the data acquired to be virtual data, if the data are judged to conform to the pre-established rule; and wherein the pre-established rule prescribes that the data acquired comprise any one of A, B, C, and D, or alternatively comprise D and any one of A, B, and C, among which:

A represents any one of a pre-established group of data, or a pre-established datum;

B represents data generated in accordance with a pre-established random number generation rule;

C represents pre-established attribute information of an imaging job, including at least one selected from a group consisting of name, type of document, creator, sequence of current page data, size and creation time of the current page data of the imaging job; and D represents encrypted data obtained by encrypting above A, B, or C with a specified key.

6. The method according to claim 5, wherein the pre-established rule prescribes that the data acquired comprise a virtual data identifier and any one of A, B, C, and D, or alternatively comprise a virtual data identifier, D, and any one of A, B, and C.

7. The method according to claim 5, wherein the pre-established rule prescribes that the virtual data comprise a virtual data identifier and any one of A, B, C, and D, or alternatively comprise a virtual data identifier, D, and any one of A, B, and C.

8. The method according to claim 5, wherein the step of transmitting virtual data to the image forming apparatus via the second channel comprises transmitting the virtual data to the image forming apparatus via the second channel in any one of the following occasions:

when the current imaging job begins; or a second predetermined duration passes after the current imaging job begins, the second predetermined duration being shorter than or equal to the first predetermined duration; and when a first timeout occurs in a rendering step of the current imaging job.

9. The method according to claim 5, wherein the step of transmitting virtual data to the image forming apparatus via the second channel specifically comprises:

transmitting the virtual data continuously or periodically at intervals shorter than or equal to the first predetermined duration, after the virtual data are first sent to the image forming apparatus via the second channel.

10. The method according to claim 5, further comprising ceasing to transmit virtual data to the image forming apparatus via the second channel, upon completely rendering the current printing job, transmission of all page data, or cancellation of the current printing job.

11. The method according to claim 5, further comprising: performing supervisory control so as to cease to transmit virtual data to the image forming apparatus and perform exception handling of the imaging job, upon excess of a third predetermined duration in rendering one data page, excess of a fourth predetermined duration for the current imaging job, and/or occurrence of abnormality during communications with the image forming apparatus.

12. An image forming method, comprising the steps of:

generating virtual data used for preventing an image forming apparatus from ceasing a current imaging job due to failure of receiving any data within a first predetermined duration;

establishing a first channel and a second channel with the image forming apparatus; and transmitting page data acquired by rendering document data to be imaged to the image forming apparatus via the first channel, and transmitting virtual data to the image forming apparatus via the second channel;

wherein the step of generating virtual data further comprises generating the virtual data in accordance with a pre-established rule; and wherein the pre-established rule prescribes that the virtual data comprise any one of A, B, C, and D, or alternatively comprise D and any one of A, B, and C, among which:

A represents any one of a pre-established group of data, or a pre-established datum;

B represents data generated in accordance with a pre-established random number generation rule;

C represents pre-established attribute information of an imaging job, including at least one selected from a group consisting of name, type of document, creator, and creation time of the imaging job; and D represents encrypted data obtained after encrypting above A, B, or C with a specified key.

* * * * *